United States Patent
Jung

(10) Patent No.: US 7,868,739 B2
(45) Date of Patent: Jan. 11, 2011

(54) METHOD AND SYSTEM FOR IMPROVING FUNCTION OF READING INFORMATION FROM RFID TAG

(75) Inventor: Hee-Jae Jung, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1003 days.

(21) Appl. No.: 11/705,798

(22) Filed: Feb. 13, 2007

(65) Prior Publication Data

US 2007/0200686 A1    Aug. 30, 2007

(30) Foreign Application Priority Data

Feb. 13, 2006    (KR)    ............ 10-2006-0013894

(51) Int. Cl.
 H04Q 5/22    (2006.01)
 G08B 13/14    (2006.01)
 H04L 9/32    (2006.01)
(52) U.S. Cl. ............... 340/10.51; 340/10.1; 340/572.1; 340/5.74
(58) Field of Classification Search .......... 380/825, 380/10.51, 10.1, 572.1, 5.74
See application file for complete search history.

(56) References Cited

U.S. PATENT DOCUMENTS 3,805,265 A * 4/1974 Lester ............ 342/44
4,688,026 A * 8/1987 Scribner et al. ............. 235/385
7,212,121 B2 * 5/2007 Hashimoto et al. ........ 340/572.1
7,319,397 B2 * 1/2008 Chung et al. ............. 340/572.4
2003/0061085 A1    3/2003 Lanigan, Sr.
2004/0102865 A1    5/2004 Heusermann et al.

FOREIGN PATENT DOCUMENTS

GB    2 358 110    7/2001

* cited by examiner

*Primary Examiner*—Daniel Wu
*Assistant Examiner*—John F Mortell
(74) *Attorney, Agent, or Firm*—The Farrell Law Firm, LLP

(57) ABSTRACT

A system and method for improving a function of reading information from a Radio Frequency Identification (RFID) tag. The system includes RFID tags installed on a variety of objects, each RFID tag storing information of its associated object and upon detection of a signal based on an effective frequency range, transmitting the information; writers spaced apart at regular intervals and installed near the RFID tags, the writers writing an instruction of informing whether an area is one where it is possible to read the information from an RFID tag; and a terminal having a read-write tag in which the instruction by the writers is written at a time of entering the area where the RFID tags are installed, a terminal controller for determining a start or stop of the read function based on the instruction of the read-write tag, and an RFID reader for starting to read the information from the electronic tag based on the effective frequency range upon receipt of a start command from the terminal controller.

12 Claims, 6 Drawing Sheets

US 7,868,739 B2

METHOD AND SYSTEM FOR IMPROVING FUNCTION OF READING INFORMATION FROM RFID TAG

PRIORITY

This application claims priority under 35 U.S.C. §119 to an application filed in the Korean Intellectual Property Office on Feb. 13, 2006 and assigned Serial No. 2006-13894, the contents of which are incorporated herein by reference.

BACKGROUND OF THE INVENTION

1. Field of the Invention

The present invention relates generally to a method and system for improving a function of reading electronic tag, and in particular, to a method and system for easily checking an area where a Radio Frequency IDentification (RFID) tag is installed, using RFID technology, and improving a function of reading information from the RFID tag.

2. Description of the Related Art

An RFID technology based electronic tag is a wireless identification device that automatically collects or records information using a wireless frequency, and utilizes necessary information. The RFID technology based wireless tag has a construction based on a miniaturized integrated circuit (IC) chip and antenna, and obtains information on goods without direct contact. RFID technology is replacing conventional optical bar codes that obtain information by contact, and is being applied to various industrial fields such as electronics, clothes, foods, etc.

An RFID wireless communication system includes an RFID reader to execute a function of reading and decoding information, and an RFID transponder to provide information. The RFID transponder is also called an RFID tag. RFID tags are normally based on a passive type mutual induction method.

RFID tags can be classified into three general groups depending on function. The RFID tag can be classified into a read-write type based on all possible read and write characteristics, a write-once/read-many (worm) type based on once write and frequent read characteristics, and a read-only type based on only read characteristics.

In the read-write tag type, it is possible to frequently change information stored in a memory according to need during normal operation. For example, the read-write tag can be used for a telephone card for express-highway charge collection or a payment card of a bank. In the worm tag type, write is possible only once according to a user request. In the worm tag type, information is written on one bit in a memory of a worm tag on the scene as well as in a manufacturing factory, but the once written information is unchangeable. In the read-only tag type, a global unique code number is written based on a manufacturing company in a manufacturing process and thus, modification itself is impossible.

As described above, for RFID technology using an RFID tag, the RFID tag should be paired with an RFID reader that can identify information of the RFID tag. The RFID tag includes beneficial information on a variety of facilities, for example, traffic information and position information.

An operation of an RFID tag is as follows. If the RFID tag passes within an effective frequency range of an antenna within an RFID reader, the RFID tag senses a signal sent from the RFID reader, and transmits its stored information to the RFID reader. Accordingly, the RFID reader can read information from an RFID tag only if an RFID tag becomes positioned within the effective frequency range of the RFID reader.

However, the RFID reader cannot predict when it can read information from an RFID tag. This is because the RFID reader cannot exactly identify an RFID tag proximal presence. Thus, in a service application operation of an RFID reader, as intending to keep reading information even out of proximity where information is readable from an RFID tag, the RFID reader accumulates unnecessary information. Therefore, performance of the RFID reader deteriorates and the RFID reader also wastes power.

For a detailed description of the above process, a telematics service, an example of the service application, will be described. In the telematics service using RFID technology, an RFID reader installed on a car can be used to obtain position information and road information from an RFID tag attached to road facilities. However, the RFID reader cannot identify whether an RFID tag including traffic information and position information is installed in any particular place. Thus, the RFID reader on the car should always be maintained in the on state, and should repeatedly attempt to read an identification of an RFID tag.

Operation of a conventional RFID reader is shown in FIG. 1. The RFID reader continues executing a read operation even when an RFID tag is not nearby, and the RFID reader may read unnecessary information. Should sequentially read information from the RFID tag occur at an unpredictable time, the RFID reader cannot avoid deteriorated performance the moment it reads the information from the RFID tag positioned at a particular point, due to unnecessary information processing.

Another service application is a building information acquisition service. The building information acquisition service refers to a service in which a building is provided with an RFID tag having building information, such as a shop and the number of floors. When entering the building carrying a terminal equipped with an RFID reader, a user can easily acquire the building information. However, when attempting to keep reading the RFID tag information when the building RFID tag information is not readable, the RFID reader accumulates unnecessary information and deteriorates in performance, and the terminal equipped with the RFID reader also wastes power.

As described above, a conventional RFID reader continually and repeatedly attempts to read RFID tag information in an on state. Thus, the RFID reader performs the read operation even when the RFID tag information is not readable. Accordingly, a method in which the RFID reader can read the RFID tag information with more accuracy and efficiency is desired.

SUMMARY OF THE INVENTION

It is, therefore, an object of the present invention to provide a method and system for easily checking an area where an RFID tag is installed, and improving a function of reading information from the RFID tag.

To achieve the above and other objects, there is provided a system for improving a function of reading information from an RFID tag. The system includes RFID tags installed on a variety of objects, each RFID tag storing information of its associated object and upon detection of a signal based on an effective frequency range, transmitting the information; writers spaced apart at regular intervals and installed near the RFID tags, the writers writing an instruction of informing whether an area is one where it is possible to read the information from an RFID tag; and a terminal having a read-write tag in which the instruction by the writers is written at the time of entering the area where the RFID tags are installed, a terminal controller for determining a start or stop of the read function based on the instruction of the read-write tag, and an RFID reader for starting to read the information from the RFID tag based on the effective frequency range upon receipt of a start command from the terminal controller.

In another aspect of the present invention, there is provided a method for improving a function of reading information from an RFID tag. The method includes writing an instruction by a writer that is installed within a distance where the RFID tag is identifiable when moving to an area where the RFID tag is installed; determining whether the area is one where the RFID tag is installed, based on the written instruction; and executing the read function when the determination result is that the area is one where the RFID tag is installed.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
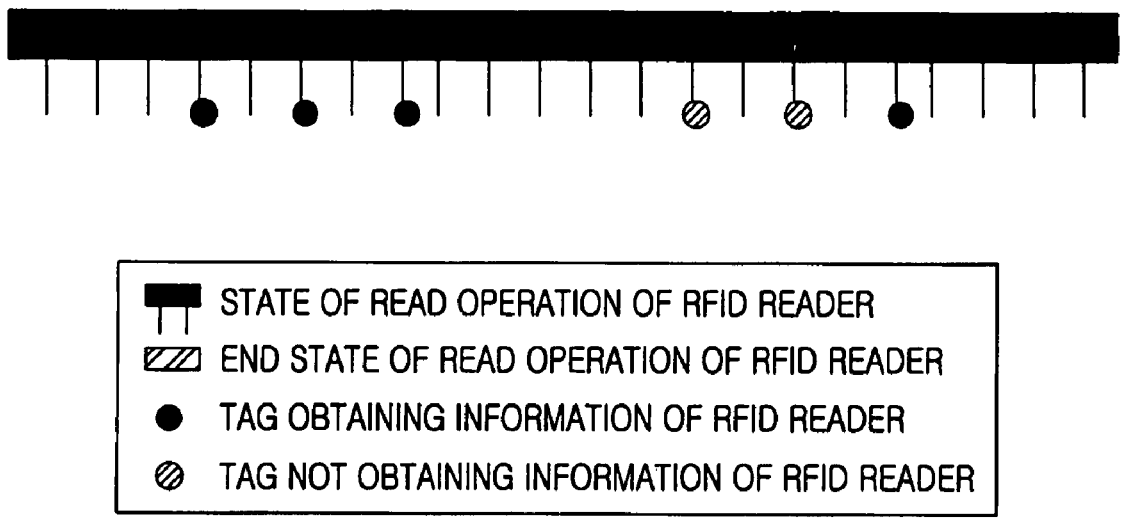
FIG. 1 illustrates a conventional read operation of an RFID reader.

A preferred embodiment of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

The present invention enables easily checking an area where a Radio Frequency Identification (RFID) tag is installed, using RFID technology, and executing a read function accurately and effectively. For this, in the present invention, writers are spaced apart at regular intervals and are installed near the RFID tag, and inform whether an area is one where the RFID tag is installed. A terminal equipped with an RFID reader includes a writable tag. Whenever the terminal with the RFID reader enters and exits the area where the RFID tag is installed, a value to inform whether the area is one where the RFID tag is installed is written by the writer in the writable tag. Thus, the RFID reader can start or stop a read operation based on the writable tag value. As such, the present invention is advantageous of improving an efficiency of the read operation with only simple device element and function as not needing to process unnecessary information.

Figure 2:
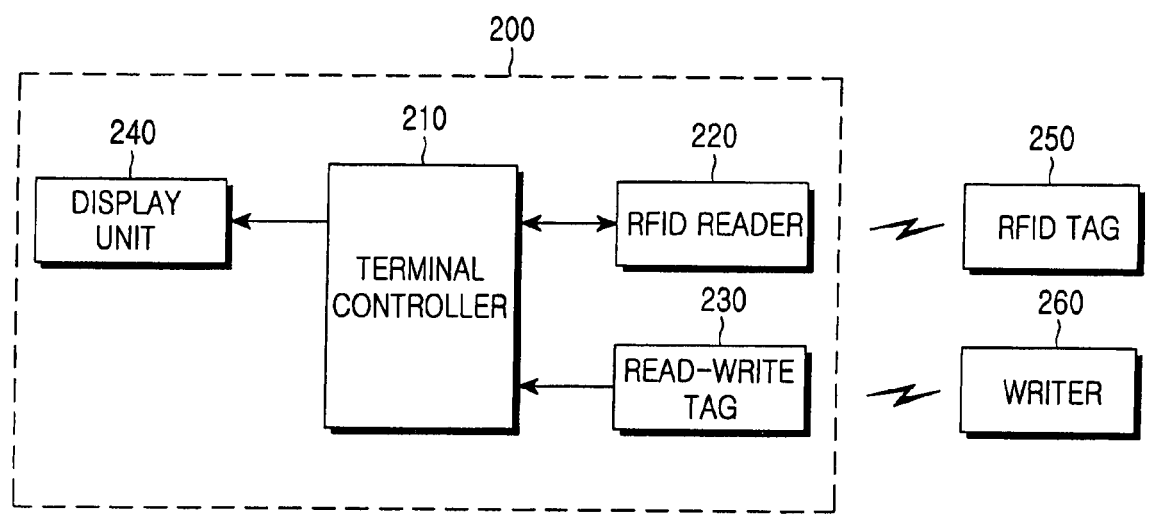
FIG. 2 is a block diagram illustrating a terminal for improving an efficiency of read operation according to the present invention.

FIG. 2 is a block diagram illustrating a terminal 200 for improving the efficiency of the read operation according to the present invention.

The terminal 200 includes a terminal controller 210, a display unit 240, an RFID reader 220, and a read-write tag 230.

The terminal controller 210 processes position relation information received from the RFID reader 220, outputs the processed information on the display unit 240 according to a user's purpose, and controls each element. The terminal controller 210 checks the read-write tag 230, and determines whether the area is one where the RFID tag is installed. According to the determination, the terminal controller 210 controls whether the RFID reader 220 starts the read operation.

Under the control of the terminal controller 210, the RFID reader 220 enables the RFID tag 250 when within a predetermined distance, and reads stored information from the RFID tag 250. For this, the RFID reader 220 generates a radio frequency (RF) signal for reading the information, e.g. a tag ID, from each RFID tag, receives the information from the RFID tag using the RF signal, and transmits the received information to the terminal controller 210. Upon the receipt of a read operation stop command from the terminal controller 210, the RFID reader 220 stops reading the information from the RFID tag 250.

The value of informing that the area is one where the RFID tag is installed is written in the read-write tag 230, that is, in the writable tag by the writer 260 that is installed at a start point of the area where the RFID tag is installed. Unlike this, when the terminal 200 exits the area, a value of informing of exiting the area where the RFID tag is installed is written by another writer that is installed at an exit point of the area. A TRUE value for turning on the RFID reader 220 and executing the read operation can be written in the read-write tag 230. Similarly, a FALSE value for turning off the RFID reader 220 and stopping the read operation can be written. A specific message to instruct the read operation can be also written by the writer 260 in the read-write tag 230. In other words, a specific message to instruct to start the read operation or a specific message to instruct to stop the read operation can be written in the read-write tag 230.

RFID tags 250 can be installed at regular intervals in particular locations depending on a service application. The RFID tag 250 stores beneficial information on a variety of facilities at the position, for example, not only traffic information and position information but also information relating to at least one position among the tag ID for distinguishing the position.

Figure 4A:
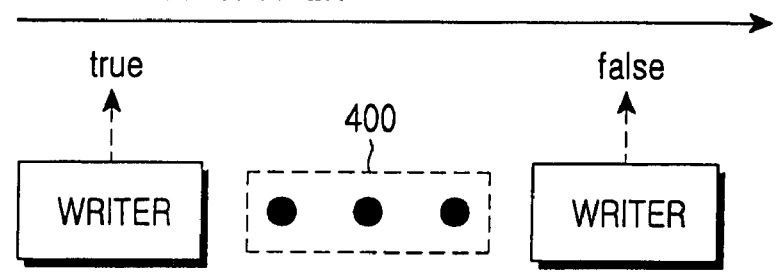
FIG. 4A is a diagram illustrating that IN and OUT are clear in an area where RFID tags are installed according to the present invention.
Figure 4B:
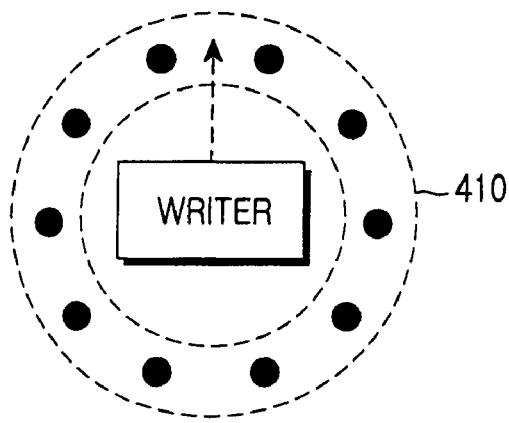
FIG. 4B is a diagram illustrating that IN and OUT are unclear in an area where RFID tags are installed according to the present invention.

When the terminal 200 moves to the area where the RFID tags 250 are installed, the writers 260 write in the read-write tag 230 of the terminal 200 an instruction to inform whether it is possible to read the information from the RFID tag. The writers 260 are spaced apart at regular intervals and are installed near the RFID tags 250 in order to inform that the RFID reader 220 has come in the RFID tag readable area. The spaced-apart interval means that the RFID reader 220 is within a distance where the RFID tags are identifiable. Thus, the writers 260 are installed near RFID tags 250 where beneficial information such as position information or building information is stored. Referring to FIGS. 4A and 4B, FIG. 4A is a diagram illustrating a case that IN and OUT are clear in the area where the RFID tags 250 are installed. FIG. 4A shows a case where the terminal 200 equipped with the RFID reader 220 moves to the right. In the area, such as on-road, where RFID tags 400 are installed in line, the IN direction and OUT direction are specifically determined. Thus, the writers are installed one by one at an entrance side of the IN direction and an exit side of the OUT direction, respectively. Accordingly, when the terminal 200 enters the area, that is, when the terminal 200 comes to a point where its RFID reader 220 can read the RFID tags, the writer at the entrance side writes the TRUE value to inform that the area is one where the RFID tag is installed, in the read-write tag 230 of the terminal 200. The TRUE value means that since the terminal 200 comes to a point where the RFID reader 220 can read the RFID tags, the RFID reader 220 can start the read operation.

In FIG. 4B, one writer is installed to write a TRUE value to inform that the area is one where the RFID tag is installed, and current time information, in the read-write tag 230 of the terminal 200 when the IN direction and the OUT direction are unclear in the area where the RFID tags 410 are installed. Thus, when the terminal 200 enters the area, the RFID reader 220 is controlled to start the read operation on the basis of the TRUE value written in the read-write tag 230. The terminal 200 determines whether a preset time lapses based on the time information written in the read-write tag 230 together with the TRUE value. For example, upon the lapse of more than ten seconds since a written time, the terminal 200 determines exiting the RFID tag readable extent, and controls to stop the read operation of the RFID reader 220.

Figure 3:
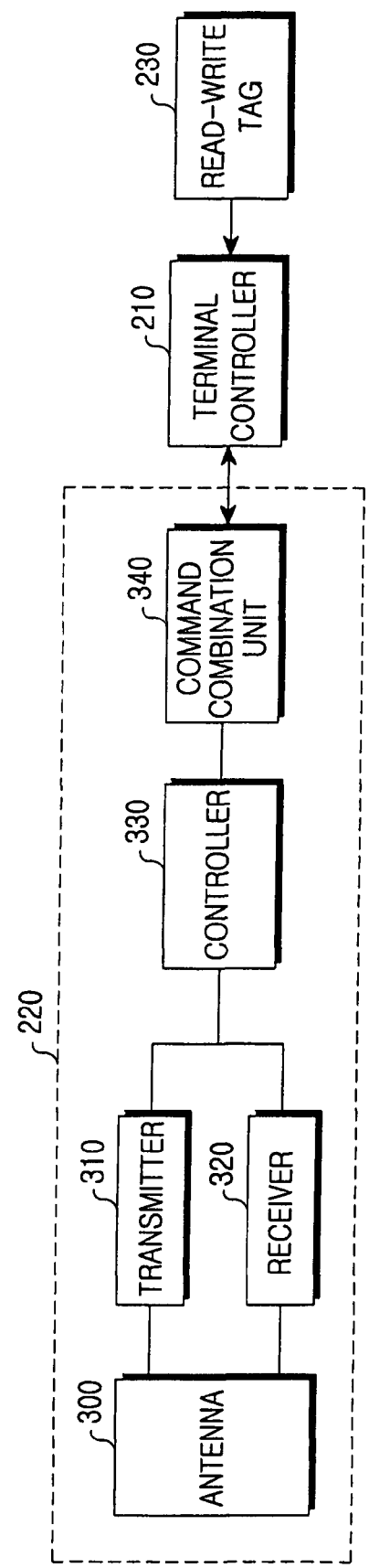
FIG. 3 is a block diagram of the RFID reader shown in FIG. 2.

FIG. 3 is a detailed block diagram illustrating the RFID reader 220 shown in FIG. 2. As shown in FIG. 3, the RFID reader 220 includes an antenna 300, a transmitter 310, a receiver 320, a controller 330, and a command combination unit 340.

The antenna 300 transmits a predetermined frequency based on a signal format to each RFID tag 250 in order to receive information from each RFID tag 250. The antenna 300 receives information from an RFID tag 250 when the reader 220 is within an effective frequency range, by a non-contact method. The transmitter 310 transmits an effective frequency signal to be transmitted to the RFID tag 250, to the antenna 300. The receiver 320 reads and identifies the information received from the RFID tag 250 through the antenna 300. Thus, the controller 330 converts the information read and identified in the receiver 320, into digital signal, using an analog-to-digital converter (ADC). The controller 330 controls the transmitter 310 and the receiver 320 to process and transmit the information to the terminal controller 210 for provision to a user. The controller 330 controls and transmits a microwave based on suitable intensity and RFID frequency. The microwave is transmitted through the antenna 300. The frequency or intensity of the microwave being used varies according to the country because a standard different is used in each country. The frequency or intensity has not been standardized and thus, it is desirable that the terminal can change in its internal circuit structure depending on the frequency and intensity.

Communication between the controller 330 and the terminal controller 210 is performed using a command. The command combination unit 340 constructs a command set for mutual communication. According to the tag value of the read-write tag 230, the terminal controller 210 converts the command of starting or stopping the read operation of the RFID reader 220, into a format adapted to the RFID reader 220. The command combination unit 340 generates the command set, which is a combination of the commands of starting or stopping the read operation, and transmits the generated command set to the controller 330. Upon the receipt of the command set, the controller 330 controls the transmitter 310 for the read operation.

Figure 5:
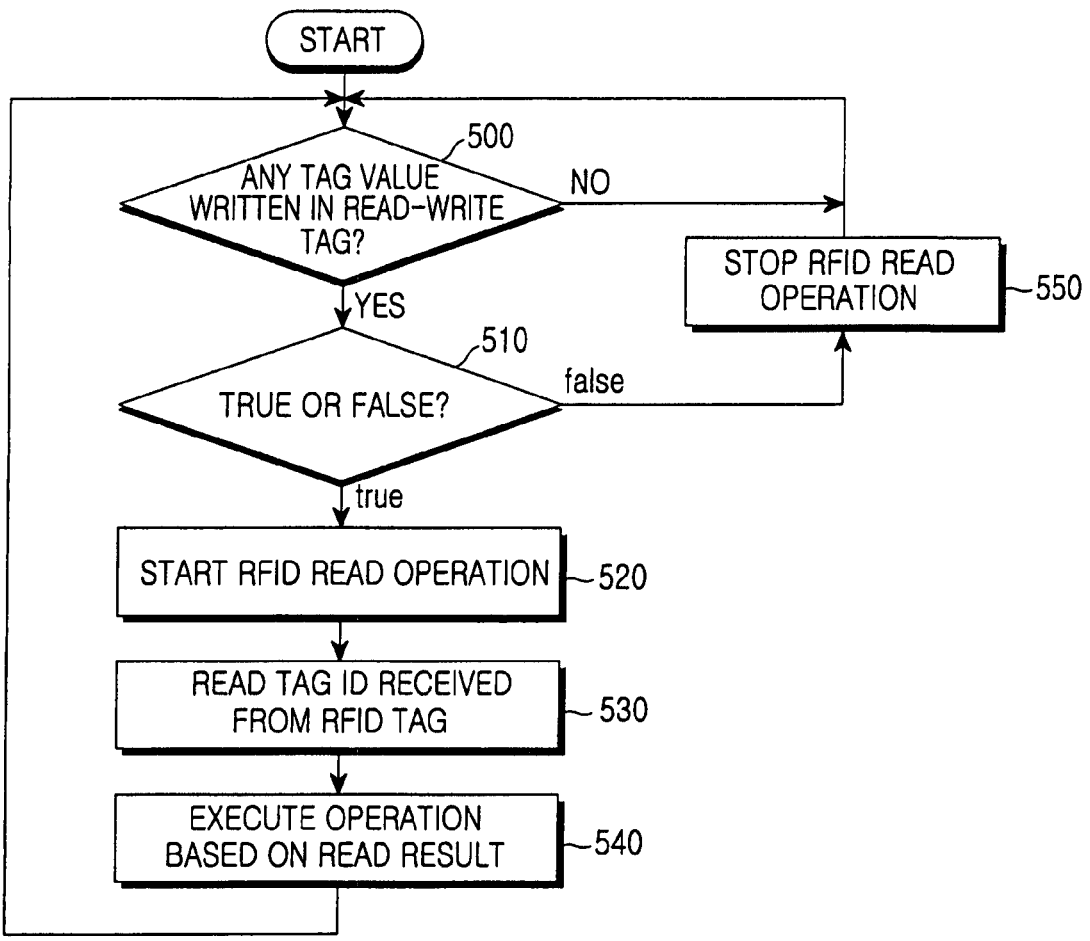
FIG. 5 is a flowchart for determining an execution time of a read operation in a terminal according to the present invention.

FIG. 5 is a flowchart for determining an execution time point of the read operation in the terminal according to the present invention.

The terminal controller 210 determines whether there exists a tag value written in the read-write tag 230 in Step 500. If the determination result is that there exists the written tag value, the terminal controller 210 proceeds with Step 510 and determines whether the written tag value is TRUE or FALSE. If the written tag value is FALSE, the terminal controller 210 identifies that the area is not one where RFID tags are installed, and stops the RFID read operation in Step 550. When the RFID read operation is stopped, the read operation is maintained as stopped. When the RFID read operation is executed, the read operation in execution is stopped.

If the written tag value is TRUE, the terminal controller 210 identifies entry into the area where the RFID tags are installed, and controls the RFID reader 220 to start the read operation. Thus, the terminal controller 210 transmits the command of starting the read operation to the RFID reader 220, and the RFID reader 220 starts the RFID read operation in Step 520. In Step 530, the RFID reader 220 reads the tag ID received from the RFID tag. Upon the receipt of the read result from the RFID reader 230, the terminal controller 210 performs an operation based on the read result in Step 540. Accordingly, the terminal controller 210 can process and output the read result on the display unit 240, thereby informing the user of the information. After that, returning again to the Step 500, the terminal controller 210 determines whether or not there is the tag value written in the read-write tag 230. In other words, when the determination result is that there is the written tag value, the terminal controller 210 determines whether or not the read operation starts or stops, on the basis of the tag value.

Figure 6:
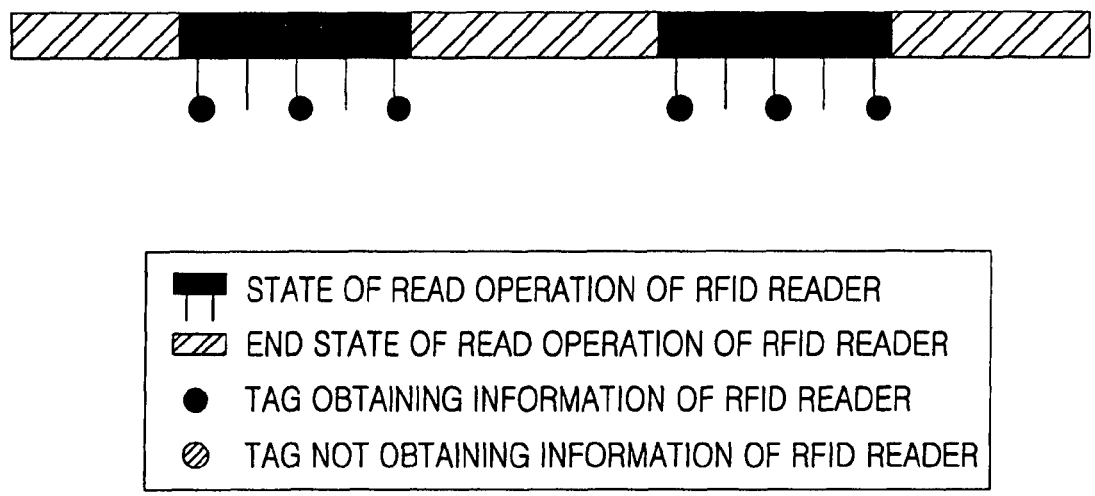
FIG. 6 illustrates a read operation of an RFID reader according to the present invention.

As described above, according to the present invention, the terminal controller 210 determines whether the read operation starts or stops based on the tag value written by the writer in the read-write tag 230. Depending on the determination, a process of executing the read operation of the RFID reader 220 is repeatedly performed. FIG. 6 illustrates the read operation of the RFID reader according to the present invention.

FIG. 6 shows that while executing the read operation in the area where the RFID tags are installed, when exiting the area, the RFID reader also ends the read operation, and when again entering the area where the RFID tags are installed, the RFID reader again starts the read operation, and when exiting the area, the RFID reader stops the read operation. The read operation starts and stops when the writer, which is installed in the area where the RFID tags are installed, writes a specific tag value or a specific message in the read-write tag.

As described above, in the present invention, having to read consecutive RFID tags at unpredictable times, the RFID reader executes the read operation only in the area where the RFID tags are installed. Therefore, since unnecessary information is not being processed, not only is the RFID reader performance improved, but the RFID tag information can also be read with more accuracy and effectiveness.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A system for improving a function of reading information from a Radio Frequency IDentification (RFID) tag, the system comprising:

RFID tags installed on a variety of objects, each tag storing information of its associated object and upon detection of a signal based on an effective frequency range, transmitting the information;

writers spaced apart at regular intervals and installed near the RFID tags, the writers writing an instruction informing whether it is possible to read information from an RFID tag in an area; and a terminal having a read-write tag in which the instruction by the writer is written at a time of entering the area where the RFID tags are installed, a terminal controller for determining a start or stop of a read function based on the instruction of the read-write tag, and an RFID reader for starting to read the information from the RFID tag based on the effective frequency range upon receipt of a start command from the terminal controller and for stopping reading from the RFID tag when the RFID reader receives a command of stopping the read function from the terminal controller.

2. The system of claim 1, wherein the writers are installed one by one at an entrance side of an IN direction and an exit side of an OUT direction, respectively, in the area where the RFID tags are installed.

3. The system of claim 2, wherein a writer at the entrance side of the IN direction writes the instruction informing whether it is possible to read the information from the RFID tag, and a writer at the exit side of the OUT direction writes an instruction informing of exiting the area where it is possible to read the information from the RFID tag.

4. The system of claim 3, wherein the terminal controller stops the read function of the RFID reader based on the instruction written in the read-write tag if the instruction by the writer is written in the read-write tag at the time of exiting the area where the RFID tags are installed.

5. The system of claim 1, wherein, in the area where the RFID tags are installed, the writer is installed at an entrance side of an IN direction, and writes time information, together with an instruction of informing of being in the area where it is possible to read the information from the RFID tag, in the read-write tag of the terminal to enter the area where the RFID tags are installed.

6. The system of claim 5, wherein if the time information is written, together with the instruction by the writer, in the read-write tag at the time of entering the area where the RFID tags are installed, the terminal controller starts the read function of the RFID reader, determines whether a predetermined reference time is exceeded on the basis of the time information, and upon an excess of the reference time, identifies exiting the area where the RFID tag are installed and stops the read function of the RFID reader.

7. The system of claim 1, wherein the RFID reader starts or stops the read function according to a command from the terminal controller.

8. A method for improving a function of reading information from an RFID tag, the method comprising:

writing an instruction in a read-write tag by a writer that is installed within a distance where the RFID tag is identifiable when a terminal having the read-write tag moves to an area where the RFID tag is installed;

determining whether the area is one where the RFID tag is installed, based on the written instruction; and executing the read function when the determination result is that the area is one where the RFID tag is installed and stopping the read function when the determination result is that the terminal is exiting the area where the RFID tag is installed.

9. The method of claim 8, further comprising stopping the read function when the determination result is that the area is not one where the RFID tag is installed.

10. The method of claim 8, further comprising:
starting the read function when time information is written by the writer together with the instruction;

determining whether a reference time is exceeded based on the time information; and identifying exiting the area where the RFID tag is installed and stopping the read function when the determination result is that the reference time is exceeded.

11. The method of claim 8, wherein in the step of writing the instruction by the writer installed in the area, at the time of entering the area where the RFID tags are installed in line, an instruction of informing of being in the area where it is possible to read the information from the RFID tag is written by the writer that is installed at an entrance side of an IN direction.

12. The method of claim 11, further comprising writing an instruction informing of exiting the area where it is possible to read the information from the RFID tag by the writer that is installed at an exit side of an OUT direction at a time of exiting the area where the RFID tags are installed.

* * * * *